(12) United States Patent
Lin et al.

(10) Patent No.: US 10,096,215 B1
(45) Date of Patent: Oct. 9, 2018

(54) NON-ELECTRICAL POWER OPERATED SENSOR AND MONITORING SYSTEM USING THE SAME

(71) Applicant: AMBIT MICROSYSTEMS (SHANGHAI) LTD., Shanghai (CN)

(72) Inventors: Yi-Chuan Lin, New Taipei (TW); Yu-Hu Yan, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 15/627,552

(22) Filed: Jun. 20, 2017

(30) Foreign Application Priority Data

Mar. 29, 2017 (TW) .............................. 106110601 A

(51) Int. Cl.
| | |
|---|---|
| *G08B 13/10* | (2006.01) |
| *G08B 13/08* | (2006.01) |
| *F16K 37/00* | (2006.01) |
| *F16K 31/122* | (2006.01) |

(52) U.S. Cl.
CPC ............ *G08B 13/08* (2013.01); *F16K 31/122* (2013.01); *F16K 37/0008* (2013.01)

(58) Field of Classification Search
CPC ...... G08B 13/08; G08B 13/20; G08B 29/185; G08B 17/04; G08B 19/005; G21B 1/03; E05B 47/0046; A63B 21/0087
USPC .......... 340/545.1, 544, 545.2, 545.5; 116/65, 116/86, 103; 292/341.16; 49/324
See application file for complete search history.

(56) References Cited

U.S. PATENT DOCUMENTS

| | | | | |
|---|---|---|---|---|
| 3,921,563 A | * | 11/1975 | Edwards ................ | G08B 13/20 116/103 |
| 4,712,775 A | | 12/1987 | Buma et al. | |
| 5,197,407 A | * | 3/1993 | Sims ...................... | G08B 13/18 116/112 |
| 5,317,303 A | * | 5/1994 | Ross ...................... | G08B 13/08 340/539.26 |
| 5,572,190 A | * | 11/1996 | Ross ...................... | G08B 13/08 340/530 |
| 6,292,100 B1 | * | 9/2001 | Dowling ................ | G08B 13/08 340/545.1 |

(Continued)

FOREIGN PATENT DOCUMENTS

| | | |
|---|---|---|
| CN | 100348043 C | 11/2007 |
| CN | 201163525 Y | 12/2008 |

(Continued)

*Primary Examiner* — Firmin Backer
*Assistant Examiner* — Munear Akki
(74) *Attorney, Agent, or Firm* — ScienBiziP, P.C.

(57) ABSTRACT

A non-electrical power operated sensor determining the position and movement of a first object in relation to a second object includes a valve on the first object. The valve has a housing and a cavity. A first sound device is mounted on one side of the housing and connected to the cavity. A second sound device is mounted on the other side of the housing and connected to the cavity. A piston connects the second object and the valve. The piston includes a push rod extending from one side of the plug body and the push rod being moved one way or another way causes one sound or another sound to be made. The disclosure also provides a monitoring system listening for the one sound or for the other sound, the system being able to instantly communicate with an electronic device of a user.

12 Claims, 5 Drawing Sheets

(56) References Cited

U.S. PATENT DOCUMENTS

| | | | |
|---|---|---|---|
| 6,891,479 B1 * | 5/2005 | Eccleston | E05F 15/63 116/86 |
| 7,032,611 B1 | 4/2006 | Sheng | |
| 7,795,746 B2 * | 9/2010 | Riley | H02K 7/1853 290/1 R |
| 8,225,458 B1 * | 7/2012 | Hoffberg | E05F 3/102 16/49 |
| 8,764,071 B2 * | 7/2014 | Lanigan | E05B 47/0046 292/251.5 |
| 2008/0115543 A1 * | 5/2008 | Lanigan | E05B 47/0046 70/57.1 |
| 2008/0146143 A1 * | 6/2008 | Chilelli | E05F 3/22 454/195 |
| 2009/0271207 A1 * | 10/2009 | Lanigan | G07C 9/00103 705/1.1 |

FOREIGN PATENT DOCUMENTS

| | | |
|---|---|---|
| CN | 201771390 U | 3/2011 |
| WO | 2008/094224 A2 | 8/2008 |

* cited by examiner

NON-ELECTRICAL POWER OPERATED SENSOR AND MONITORING SYSTEM USING THE SAME

FIELD

The subject matter herein generally relates to the field of security systems, and more particularly to a sensor and monitoring system using the same.

BACKGROUND

Sensors can be installed in the doors or windows at home, and a security monitoring system matched with the sensor to monitor and protect properties at home. When a door or window is opened, the sensor senses the opening of the door or window and sends an alarm to the user through the security monitoring system to warn the user.

Conventional sensors need power supply, such as cable-connected power supplies or battery-powered. For the sensors using cable-connected power supplies, an exposed proper cable arrangement is unattractive. For the sensors that use battery, sufficient power is needed for the sensor to work normally, but no electricity when battery is exhausted leads to the sensor failure, and the properties in the house will be in danger.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
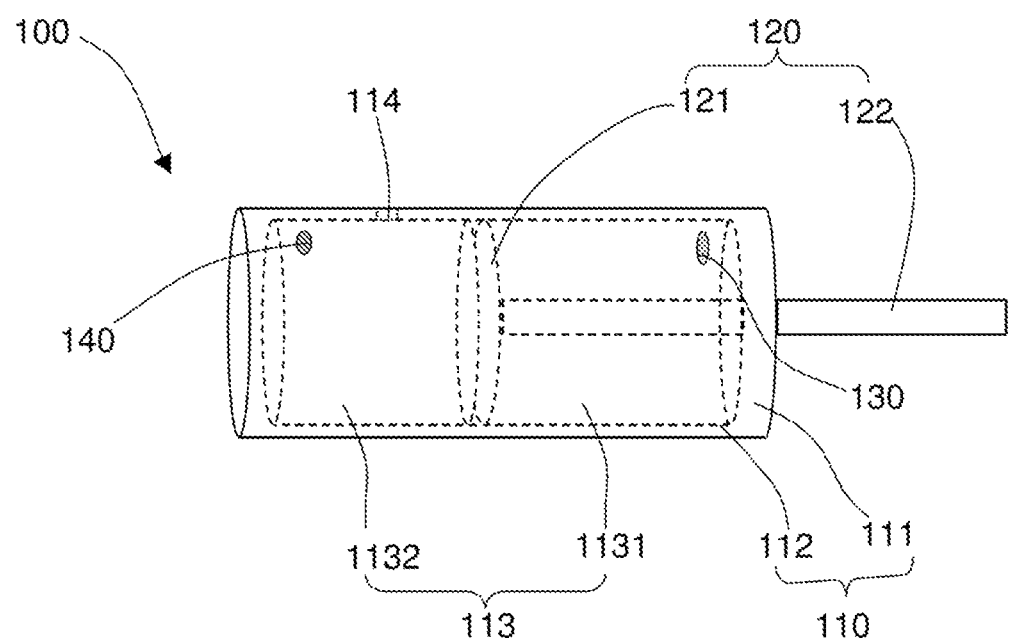
FIG. 1 is an perspective view of an exemplary embodiment of a non-electrical power operated sensor.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 shows an exemplary embodiment of a non-electrical power operated sensor 100. In FIG. 1, the non-electrical power operated sensor 100 includes a gas valve 110, a first sound device 130, a second sound device 140 mounted on each end of the gas valve 110, and a piston 120 slidably mounted inside the gas valve 110. The gas valve 110 includes a housing 111 and a cavity 112 formed in the housing 111. The housing 111 is cylindrical shape with an inner void. A side wall of the cavity 112 is a substantially smooth circular arc surface. A surface of the housing 111 has a bleed hole 114 communicating with the cavity 112. The piston 120 includes a plug body 121 and a push rod 122 extending from one side of the plug body 121. The plug body 121 is slidably connected to the inner side wall of the cavity 112 to form an air chamber 113 and separates the air chamber 113 into a first air chamber 1131 and a second air chamber 1132. The push rod 122 is located in the first air chamber 1131. The first sound device 130 is mounted on one end of the housing 111 and communicates with the first air chamber 1131, the second sound device 140 is mounted on another end of the housing and communicates with the second air chamber 1132. The bleed hole 114 is provided between the first sound device 130 and the second sound device 140.

The first sound device 130 and the second sound device 140 are each provided with an air inlet, an air outlet, and a sound chamber (not shown). The structure of the first sound device 130 and the second sound device 140 can be flute-like or whistle-like. When air is blown from the air inlet into the sound chamber and blown out from the air outlet, the sound chamber vibrates to generate a sound. The size of the sound chamber determines the sound frequency of the sound device. The size of the sound chamber of the first sound device 130 is different from the size of the sound chamber of the second sound device 140. Therefore, when the air is blown into the first sound device 130 and the second sound device 140, the first sound device 130 makes a first sound, and the second device 140 makes a second sound. The frequency of the first sound is different from that of the second sound.

In the exemplary embodiment, both of the first sound device 130 and the second sound device 140 are ultrasonic flutes. The first sound wave by the first sound device 130 has a frequency of 60 kHz. The second sound wave by the second sound device 140 has a frequency of 30 kHz. When the housing 111 moves relative to the piston 120, the plug body 121 moves back and forth in the cavity 112. The first air chamber 1131 or the second air chamber 1132 is compressed by the piston 120. As such, the first sound device 130 or the second sound device 140 makes either the first sound or the second sound.

The bleed hole 114 of the housing 111 has a filter structure (not shown) for filtering dust and water vapor. The filter structure can be a sponge or a filter screen. The cavity 112 is in communication with an outside of the housing 111 through the bleed hole 114. The air outside of the housing 111 may contain water vapor or dust. As the plug body 121 slides in the cavity 112, the air in the first air chamber 1131 and in the second air chamber 1132 is exchanged with the air from the outside of the housing 111, and water and dust can enter into the cavity 112 with the outside air. The water vapor or dust in the air will accelerate wear of the plug body 121, thereby reducing the service life of the piston 120. Therefore, the air outside of the housing 111 is subjected to a filtering process of the sponge and the filter screen before entering the cavity 112. The impurities such as water vapor, dust, and the like in the air are adsorbed or blocked by the filter structure to ensure that the air which enters into the chamber 112 is dry and clean. The filter structure is not limited to sponges and filter screen. In other embodiments, other materials or structures capable of drying and filtering air may be used in place of sponges and filter screen.

The working process of the non-electrical power operated sensor 100 is described with reference to FIGS. 1-3.

Referring to FIG. 1, the housing 111 is fixed to a support (not shown), and the rod 122 is fixed to a window/door (not shown). The plug body 121 of the piston 120 is located at an intermediate position in the cavity 112. The first air chamber 1131 and the second air chamber 1132 are not compressed, and the first sound device 130 and the second sound device 140 do not make any sound.

Figure 2:
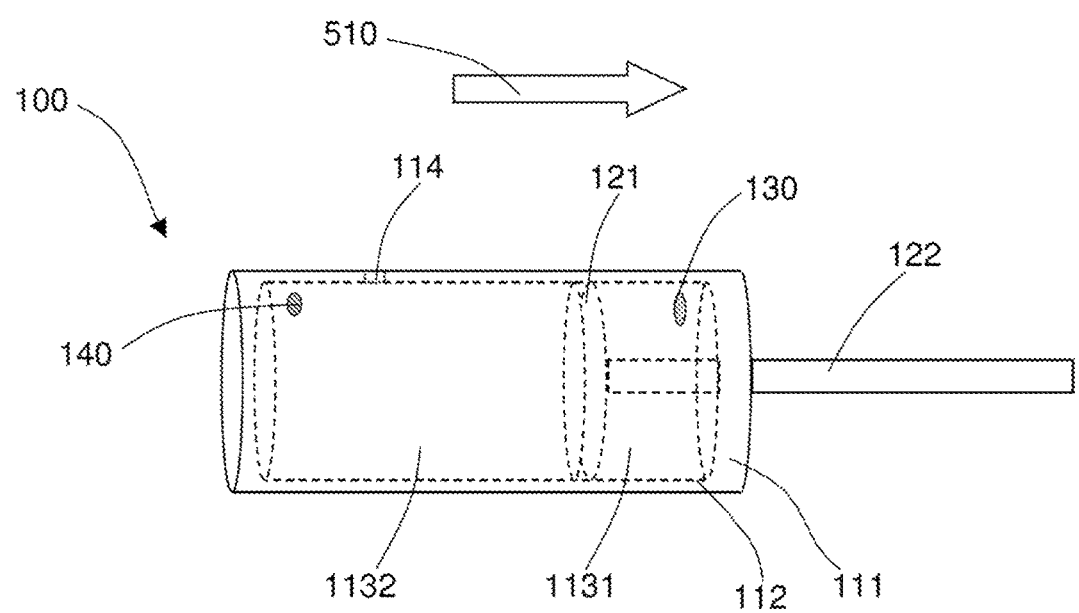
FIG. 2 shows the structure of the non-electrical power operated sensor of FIG. 1 after a piston has moved.

Referring to FIG. 2, when the window/door is opened by a user, the window pulls the push rod 122 in a first direction 510. And the push rod 122 drives the plug body 121 to slide in the first direction 510 away from the middle of the cavity 112. The first air chamber 1131 is compressed by the plug body 121. The compressed air in the first air chamber 1131 flows into the first sound device 130 and is discharged from the first sound device 130, and the first sound device 130 makes the first sound. The second air chamber 1132 is not compressed and the second sound device 140 makes no sound.

Figure 3:
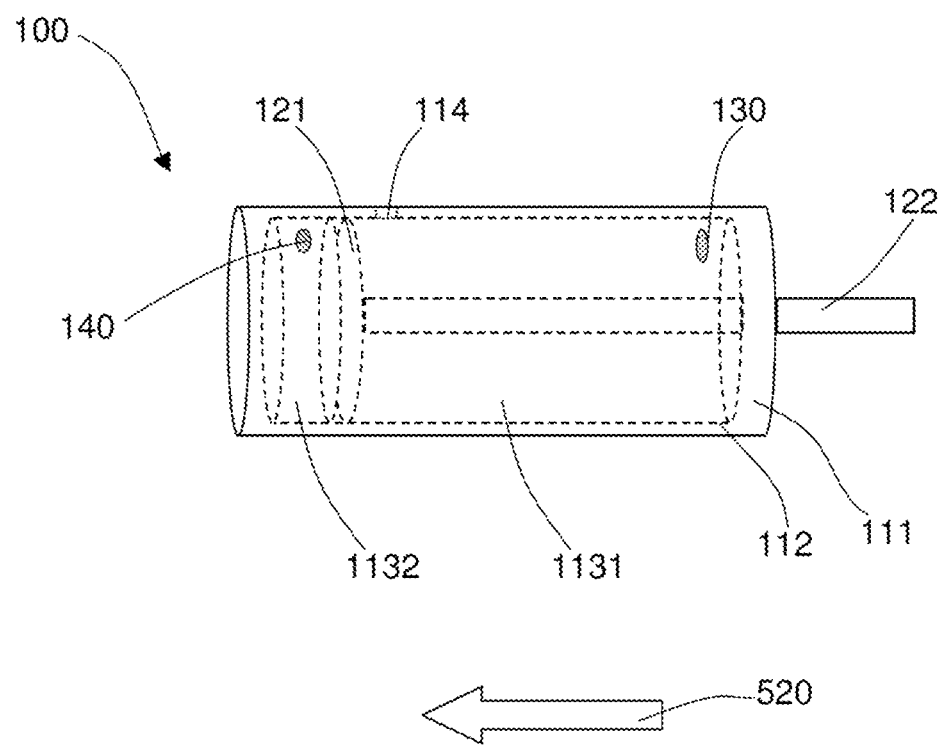
FIG. 3 shows the structure of the non-electrical power operated sensor of FIG. 1 after the piston has moved to another position.

Referring to FIG. 3, when the window/door is closed by the user, the window pulls the push rod 122 in a second direction 520. The push rod 122 drives the plug body 121 to slide in the second direction 520. In the process of the plug body 121 sliding and compressing the second gas chamber 1132 in the second direction 520, and the process before the sliding position of the plug body 121 goes beyond the bleed hole 114, the air of the second air chamber 1132 is compressed by the plug body 121 and discharged from the bleed hole 114. The second sound device 140 does not make a sound. Then, as the sliding position of the plug body 121 goes past the bleed hole 114, the air of the second air chamber 1132 is compressed by the plug body 121 and discharged through the second sound device 140. As such, the second sound device 140 makes the second sound.

Figure 4:
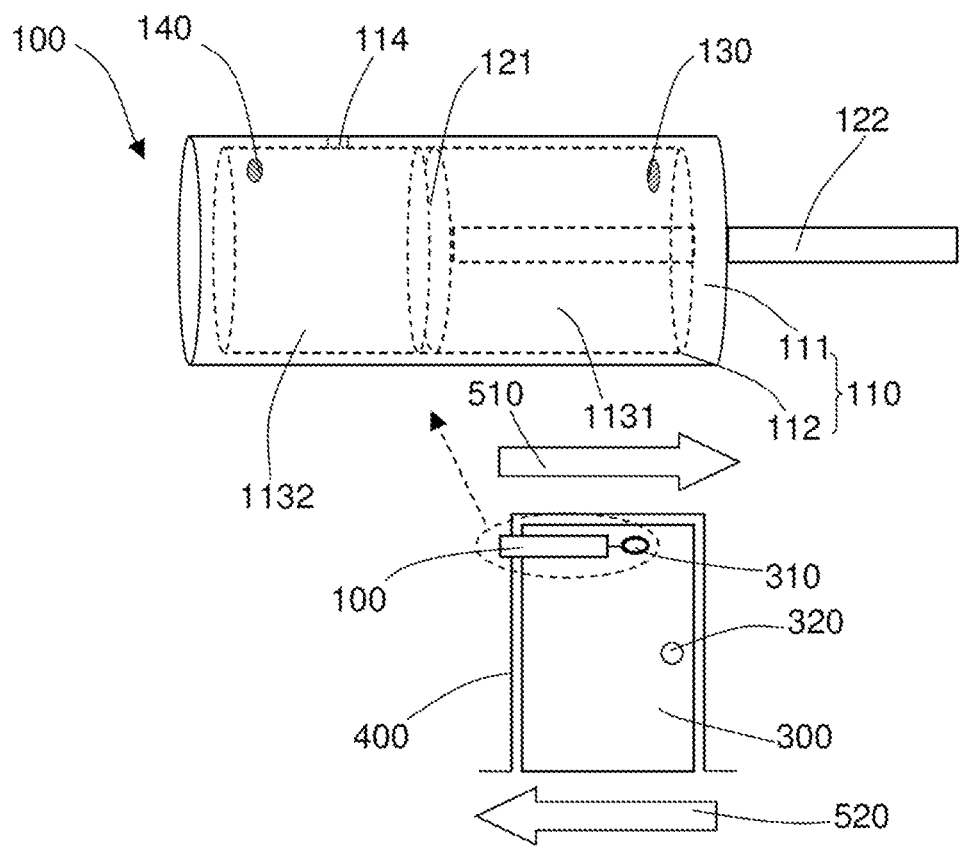
FIG. 4 shows a schematic representation of the non-electrical power operated sensor of FIG. 1 mounted between a first test object and a second test object.

FIG. 4 is an embodiment of the non-electrical power operated sensor 100 mounted on a first test object 400 and a second test object 300. In the exemplary embodiment, the first test object 400 is a door frame, and the second test object 300 is a sliding window/door. The second test object 300 is slidably mounted on the first test object 400. Thus, the second test object 300 can slide in the first direction 510 or in the second direction 520 to move away from or close to the first test object 400. The housing 111 of the gas valve 110 is mounted on the first test object 400. The push rod 122 is mounted on a connection block 310 of the second test object 300. A handle 320 is mounted on the second test object 300.

When the handle 320 is pushed in the first direction 510 by a user, the handle 320 drives the second test object 300 to move away from the first test object 400. The second test object 300 drives the push rod 122 connected to the connection block 310 of the second test object 300 to move in the first direction 510. The plug body 121 slides with the push rod 122 in the first direction 510 to compress the first air chamber 1131. The compressed air of the first air chamber 1131 is forced into the first sound device 130, and discharged with sound from the first sound device 130. As such, the first sound device 130 makes the first sound. At this time, the first test object 400 and the second test object 300 are in an open state.

When the handle 320 is pulled in the second direction 520 by the user, the handle 320 drives the second test object 300 to move toward the first test object 400. The second test object 300 drives the push rod 122 and the plug body 121 to move toward the second direction 520. In the process the plug body 121 slides and compresses the second gas chamber 1132 in the second direction 520, and until the sliding position of the plug body 121 goes past the bleed hole 114, the air of the second air chamber 1132 is compressed by the plug body 121 and discharged from the bleed hole 114. The second sound device 140 does not make sound, and the second test object 300 has not yet abutted the first test object 400. Then the plug body 121 continues to slide and goes past the bleed hole 114, and the air of the second air chamber 1132 starts to be compressed by the plug body 121. The compressed air of the second air chamber 1132 is discharged from the second sound device 140. As such, the second sound device 140 makes the second sound. After the second sound device 140 stops making sound, the second subject 300 touches the first subject 400. At that time, the first subject 400 and the second subject 300 are in a closed state.

In general, when the second test object 300 moves away from the first test object 400, the non-electrical power operated sensor 100 makes the first sound, having a frequency of 60 kHz. When the second test object 300 moves toward the first subject 400, the non-electrical power operated sensor 100 makes the second sound, having a frequency of 30 kHz. Thus, the non-electrical power operated sensor 100 can be used to determine the starting point and the actions of the first test object 400 and the second test object 300, because of the difference in frequency.

It should be noted that, in other embodiments, the first object 400 can be a wall and the second test object 300 can be a window. The relative movement between the first test object 400 and the second test object 300 is not limited to sliding, but can also be a rotation. Correspondingly, the housing 111 of the non-electrical power operated sensor 100 is rotatably connected to the first test object 400, and the push rod 122 is connected to the second test object 300 by a rotary connection structure. The rotary connection structure can be shafts and connecting rods. As such, when relative rotation occurs between the first test object 400 and the second test object 300, the housing 111 and the push rod 122 also move relative to each other.

Figure 5:
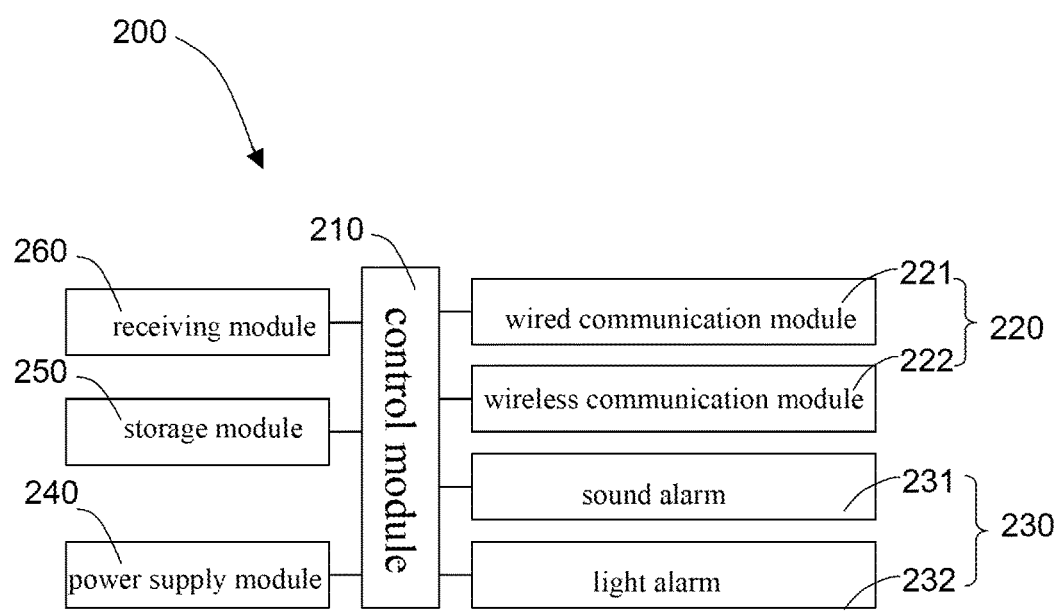
FIG. 5 is a block diagram showing the configuration of a monitoring module according to an embodiment of the invention.

Referring to FIGS. 4 and 5, the application also provides a monitoring system with a non-electrical power operated sensor 100 for monitoring the positional state of the first test object 400 and the adjacent second test object 300. The monitoring system includes a non-electrical power operated sensor 100 connected with the first test object 400 and the second test object 300. When the first test object 400 moves relative to the second test object 300, the non-electrical power operated sensor 100 makes the first sound or the second sound. The frequency of the first sound is different from the second sound. A monitoring module 200 includes a receiving module 260 for receiving sounds from the non-electrical power operated sensor 100 and sending a notification signal based on whether the first sound or the second sound is made. A control module 210 for determining a position state of the first test object 400 relative to the second test object 300 can be based on the notification signal. A communication module 220, for sending the position state of the first test object 400 relative to the second test object 300, to a user's electronic device. The first sound and the second sound made by the non-electrical power operated 100 are sound waves of different frequencies and indicate the position state of the first test object 400 relative to the second test object 300.

As shown in FIGS. 4 and 5, the monitoring module 200 can be mounted on the first test object 400 near to the non-electrical power operated 100. The monitoring module 200 further includes an alarm module 230, a storage module 250, and a power supply module 240. The alarm module 230 and the power supply module 240 are each connected to the control module 210. The receiving module 260 receives different sound frequencies made by the non-electrical power operated 100 when the first test object 400 moves relative to the second test object 300. The communication module 220 includes a wireless communication module 222 for performing wireless communication, and a wired communication module 221 for wired communication. The wireless communication module 222 and the wired communication module 221 are each connected to the control module 210. The control module 210 selects the wireless communication module 222 or the wired communication module 221 to communicate with the user's electronic device (not shown) connected to the monitoring module 200. The alarm module 230 includes a sound alarm 231 and a light alarm 232 connected to the control module 210. The power supply module 240 is used to supply power to the control module 210, the receiving module 260, the communication module 220, and the alarm module 230. The power supply module 240 can be connected to a socket by a plug.

In an initial state, the first test object 400 is close to the second test object 300. The push rod 122 is mounted on the connection block 310. The housing 111 is mounted on the first test object 400. As the first test object 400 is a window/door frame, and the second test object 300 is a sliding window/door. The second test object 300 can be pushed in the first direction 510 or in the second direction 520. When the second test object 300 is pushed in the first direction 510, the second test object 300 drives the push rod 122 and the plug body 121 of the non-electrical power operated 100 to slide toward the first direction 510. The plug body 121 presses the first gas chamber 1131. As such, the first sound device 130 makes the first sound having a frequency of 60 kHz. After the receiving module 260 receives the 60 kHz sound sent by the non-electrical power operated 100, the receiving module 260 sends a notification signal to the control module 210. The notification signal is at a logic-high electrical level. The control module 210 can determine that the first test object 400 and the second test object 300 are in the open state based on the logic-high electrical level, and that the second test object 300 has moved away from the first test object 400.

When the second test object 300 is pushed in the second direction 520, the second test object 300 drives the push rod 122 and the plug body 121 to slide toward the second direction 520. The plug body 121 presses the second gas chamber 1132. As such, the second sound device 140 makes the second sound of 30 kHz. After the receiving module 260 receives the 30 kHz sound, the receiving module 260 sends a notification signal to the control module 210. The notification signal is a logic-low electrical level. The control module 210 determines that the second test object 300 is moving close to the first test object 400 based on the logic-low electrical level until the receiving module 210 no longer receives sound. Then the control module 210 determines the position state of the first test object 400 relative to the second test object 300 as being in the closed state.

In other embodiments, the first sound device 130 and the second sound device 140 are exchanged. The control module 210 is configured to receive 30 kHz sound to determine that the first test object 400 and the second test object 300 are in the open state. After the control module 210 receives the 60 kHz sound, the control module 210 can determine that the position between the first test object 400 and the second test object 300 is the closed state. When the control module 210 determines that the first test object 400 relative to the second test object 300 is in the open state or in the closed state, the position state information of the first test object 400 and the second test object 300 is sent to the user's electronic device. Thus, the user can know the instant relative position between objects 400 and 300.

The control module 210 stores the position state information and the corresponding time to the storage module 250 when sending the position state information of the first test object 400 relative to the second test object 300 to the user. The user can search the storage module 250 through his electronic device to know the position state information and changes in relativity at any time. For example, the first test object 400 is a door frame, and the second test object 300 is a door mounted on the door frame. If items in the house are stolen, the user can search the storage module 250 through his electronic device to know exactly when it happened.

The user's electronic device can be a mobile phone or a computer, the computer can be a laptop, a desktop computer, or a tablet computer. When the electronic device is a mobile phone, the control module 210 sends the position state information of the first test object 400 relative to the second test object 300 to the mobile phone via the wireless communication module 222. When the electronic device is a desktop computer, especially a remote desktop computer, the control module 210 sends the position state information as between objects 400 and 300 through the wired communication module 222, the network cable, and the router to send to the remote desktop computer.

The position state information of the first test object 400 relative to the second test object 300 is processed into a text, video, or audio form and stored in the storage module 250 before the control module 210 sends it to the user's electronic device. When it is necessary to send the position state information to the user, the control module 210 extracts the corresponding text, video, or audio from the storage module 250, and sends it to the user's electronic device in the form of a text message, video, or audio. For example, when the user has a mobile phone and a computer, the control module 210 sends the position state information in the form of message to the mobile phone via the wireless communication module 222 first. Then, the control module 210 sends the position state information in the form of video to the computer via the wired communication module 221. As long as the user carries the mobile phone or is in front of the computer, the position state information can be immediately known at any time. The video can be a monitor video or an animation about the status of the first test object 400 and the second test object 300. The monitoring video or animation is stored in the storage module 250 in advance. When it is necessary to send the position state information, the control module 210 extracts the monitoring video or animation from the storage module 250 and sends it to the computer. In other embodiments, the control module 210 can be connected to a camera mounted in a house and aligned with the first test object 400 and the second test object 300. The control module 210 can send a video taken by the camera, about the position state of the objects 400 and 300, to the computer.

The sound alarm 231 can make a sharp audible alarm, and the light alarm 232 can make a flashing alarm. Both of the sound alarm 231 and the lighting alarm 232 has a switch. The user can visit the monitoring module 200 by using the electronic device and set the switch opening or closing state of the sound alarm 231 and the light alarm 232 through the control module 210. When the sound alarm 231 and the light alarm 232 are turned on, and the control module 210 determines that the first test object 400 relative to the second test object 300 is in the open state, the control module 210 controls the sound alarm 231 and the light alarm 232 to simultaneously issue an audible alarm and a visual alarm. For example, when the user goes out, the sound alarm 231 and the light alarm 232 are simultaneously turned on. The second test object 300 may move relative to the first subject 400 to cause the non-electrical power operated 100 to make sound. The monitoring system senses the positional states the first test object 400 relative to the second test object 300 by the different frequencies, and send the positional states through the communication module 220 of the monitoring module 200 to the user's electronic device. The user can know and deal with it. At the same time, the control module 210 of the monitoring module 200 activates the sound alarm 231 and the light alarm 232 to scare away the thieves and bring the attention of the neighbors.

The non-electrical power operated 100 does not produce a disturbing noise that affects people's lives when it is working. The non-electrical power operated 100 also does not require a power supply or the associated cable wiring. It is easy to install and maintain. The monitoring system receives the different frequencies of sound from the non-electrical power operated 100 through the receiving module 260, and determines the position state of the first test object 400 relative to the second test object 300 according to the different frequencies. The monitoring system sends the position state information of the first test object 400 relative to the second test object 300 to the user as instant information. Further, the monitoring system also has an alarm module 230. When the control module 210 determines that the first test object 400 is opened from the second test object 300, an alarm can be issued by the alarm module 230.

The exemplary embodiments shown and described above are only examples. Many details are often found in the art such as the features of sensor and monitoring system thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A non-electrical power operated sensor for judging a position state of a first test object relative to a second test object, comprising:
    a gas valve mounted in the first test object, the gas valve comprising a housing and a cavity formed in the housing;
    a first sound device mounted on one end of the housing, the first sound device is in communication with the cavity;
    a second sound device mounted on another end of the housing, the second sound device is in communication with the cavity; and
    a piston connected to the second test object and the gas valve, the piston comprising a plug body and a push rod extending from one side of the plug body, wherein the plug body is slidably connected to an inner side wall of the chamber to form an air chamber, and a push rod end is connected to the second test object;
    wherein when the position state of the first test object relative to the second test object is changed, the second test object drives the plug body to move back and forth in the cavity by the push rod, a movement of the plug body makes the air chamber being squeezed, a first sound is made by the first sound device, a second sound is made by the second device, and the first sound is different from the second sound.

2. The non-electrical power operated sensor of claim 1, wherein the plug body separates the air chamber into a first air chamber and a second air chamber, and the first sound device and the second sound device are respectively connected to the first air chamber and the second air chamber.

3. The non-electrical power operated sensor of claim 2, wherein when the first air chamber or the second air chamber is squeezed by the plug body, the first sound device makes the first sound or the second sound device makes the second sound, and a frequency of the first sound is different from that of the second sound.

4. The non-electrical power operated sensor of claim 3, wherein the first sound device and the second sound device are ultrasonic flutes, and the first sound made by the first sound device and the second sound made by the second sound device are ultrasonic waves.

5. The non-electrical power operated sensor of claim 2, wherein a surface of the housing has a bleed hole communicated with the cavity, the bleed hole is provided between the first sound device and the second sound device, and the bleed hole has a filter structure for filtering dust and moisture.

6. A monitoring system for monitoring a position state of a first test object relative to a second test object, comprising:
    a non-electrical power operated sensor comprising:
        a gas valve mounted in the first test object, the gas valve comprising a housing and a cavity formed in the housing;
        a first sound device mounted on one end of the housing, the first sound device is in communication with the cavity;
        a second sound device mounted on another end of the housing, the second sound device is in communication with the cavity; and a piston connected to the second test object and the gas valve, the piston comprising a plug body and a push rod extending from one side of the plug body, wherein the plug body is slidably connected to the inner side wall of the chamber to form an air chamber, and the push rod end is connected to the second test object;

wherein when the position state of the first test object relative to the second test object is changed, the second test object drives the plug body to move back and forth in the cavity by the push rod, the plug body movement makes the air chamber being squeezed, a first sound is made by the first sound device, a second sound is made by the second device, and the first sound is different from the second sound;

a monitoring module comprising a receiving module for receiving a different sound from the non-electrical power operated sensor and sending a corresponding notification signal based on the first sound and the second sound;

a control module for judging the position state of the first test object relative to the second test object based on the notification signal; and a communication module sending a position state of the first test object relative to the second test object to a user-bound electronic device.

7. The monitoring system of claim 6, wherein the communication module comprises a wireless communication module for wireless communication and a wired communication module for wired communication, and the wireless communication module and the wired communication module are connected to the control module.

8. The monitoring system of claim 6, wherein the user-bound electronic device comprises mobile phone and/or computer, and the control module sends the position state of the first test object relative to the second test object to the mobile phone and/or the computer in the form of short message, video or audio.

9. The monitoring system of claim 8, wherein the monitoring system further comprises an alarm module and a power supply module connected to the control module respectively, and the power supply module supplies power to the control module, the receiving module, the communication module and the alarm module.

10. The monitoring system of claim 9, wherein the position state of the first test object relative to the second test object comprises an open state and a closed state, and the alarm module is turned on or off by the control module based on user setting.

11. The monitoring system of claim 10, wherein when the alarm module is turned on, the control module judges that the position state of the first test object relative to the second test object is in the open state, and the control module controls the alarm module to send an alarm.

12. The monitoring system of claim 9, wherein the alarm module comprises a sound alarm for generating an audible alarm and a light alarm for generating a light flicker alarm, and the sound alarm and the light alarm are connected to the control module.

* * * * *